United States Patent [19]

Schoepflin

[11] Patent Number: 4,685,238
[45] Date of Patent: Aug. 11, 1987

[54] CLIP JOINING DEVICE
[75] Inventor: Stephen L. Schoepflin, Burney, Calif.
[73] Assignee: John Frank Genova, Burney, Calif.; a part interest
[21] Appl. No.: 904,416
[22] Filed: Sep. 8, 1986
[51] Int. Cl.⁴ ............................................. F41C 27/00
[52] U.S. Cl. ........................................................ 42/90
[58] Field of Search ................................ 42/90, 50, 18
[56] References Cited
U.S. PATENT DOCUMENTS 2,289,067  7/1942  Owsley ..................................... 42/50
3,110,122  11/1963  Musgrave .................................. 42/50
3,191,332  6/1965  Ardolino .................................. 42/50
3,623,256  11/1971  Shiplee, III ............................. 42/50
4,447,976  5/1984  Cooper ..................................... 42/50
4,484,403  11/1984  Schwaller ................................. 42/50
4,484,404  11/1984  Johnson .................................... 42/90

Primary Examiner—Charles T. Jordan
Attorney, Agent, or Firm—Leonard D. Schappert

[57] ABSTRACT

A clip joining device which is easily retrofittable to existing clips and which, when in position, securely holds two clips together end-to-end to increase the amount of ammunition readily available during use of a firearm.

9 Claims, 4 Drawing Figures

CLIP JOINING DEVICE

BACKGROUND OF THE INVENTION

1. Field of the Invention.

The present invention is directed generally toward devices known as magazines or clips for use in providing ammunition to guns and, more particularly, toward clip joining devices which enable an individual easily to attach two clips together to increase the amount of ammunition readily available during use of a firearm.

2. Description of the Prior Art.

In the past, inventors have directed their efforts toward joining clips or magazines of firearms together, in one instance by welding and in another instance by making a unitary double-ended clip to increase the amount of ammunition available. Other inventors have directed their efforts toward devices designed to provide a mounting capability for multiple clips so that the amount of readily available ammunition is increased during hunting or other activities. While much of the prior art has been directed toward accomplishing a purpose similar to that proposed in this application, all of the prior art of which applicant is aware has involved either relatively complex devices for joining clips which increase the potential for breakage, or devices of a permanent nature not easily retrofitted to existing clips. None of the prior art of which applicant is aware has taught the unique structure and features of the present invention.

SUMMARY OF THE INVENTION

The present invention consists of a clip joining device which is easily retrofittable to existing clips and which, when in position, securely holds two clips together end-to-end to allow for relatively easy disassembly of the clips from each other and from the clip joining device. More specifically, the clip joining device is designed to attach to the base plate at the bottom end of one clip and the base plate at the bottom end of another clip, thereby holding the bottom ends of both clips together so that, during use of a firearm, when the bullets from one clip are spent, all one needs to do to continue firing is to remove the clip, turn over the combination of the two clips and the clip joining device, position the second clip in the gun and continue firing.

One of the objects of the present invention is to provide a clip joining device which provides for the connection of the bottom plates of two clips together to double the amount of ammunition readily available during use of a weapon.

A further object of the present invention is to provide a clip joining device which, while it holds the clips rigidly in position with respect to each other, also provides sufficient flexibility so that the clips can be removed relatively easily from each other and from the clip joining device.

Another object of the present invention is to provide a clip joining device which, because of its structure, is inexpensive, relatively simple, and maintenance-free.

The foregoing objects, as well as other objects and benefits of the present invention, are made more apparent by the descriptions and claims which follow.

DESCRIPTION OF THE PREFERRED EMBODIMENT

Figure 1:
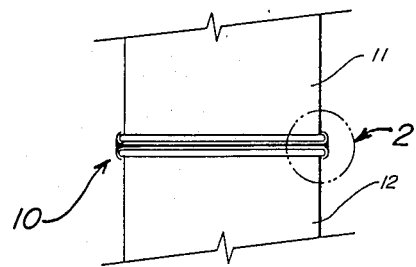
FIG. 1 is a side view of the clip joining device showing it in position with respect to the clips being joined together.

FIG. 1 of the drawings show clips 11 and 12 butted together and held in that position by clip joining device 10. FIG. 1 also shows the bottom ends of clips 11 and 12; that is, the ends opposite the end from which bullets exit during operation of a firearm.

Figure 2:
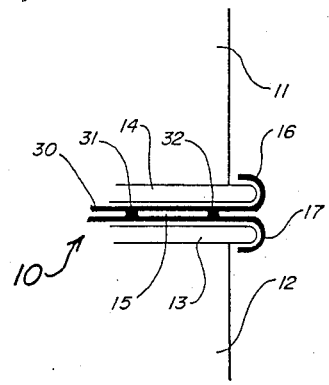
FIG. 2 is an expanded view of the encircled area of FIG. 1.

FIG. 2 is an expanded view of encircled area 2 of FIG. 1. Clip joining device 10 consists of two sections 15 and 30 constructed of sheets of metal or other structurally strong material. Sections 15 and 30 were here constructed of spring steel to ensure continued tightness during use. Sections 15 and 30 are in this embodiment attached to each other by fasteners 31 and 32. Fasteners 31 and 32 consist of welds, screws, rivets or any other effective fasteners. The bottom ends of clips 11 and 12 have bottom plates 14 and 13 respectively attached to them. Bottom plates 14 and 13 are not part of clip joining device 10, but are rather part of clips 11 and 12 respectively, and they protrude outward from clips 11 and 12 as shown.

Section 30 and section 15 of clip joining device 10 have formed sections 16 and 17 respectively, formed to fit snugly around the ends of bottom plates 14 and 13. Formed sections 16 and 17 are typical and identical formed sections are utilized at the opposite end of clip joining device 10 as shown in FIG. 1.

Figure 3:
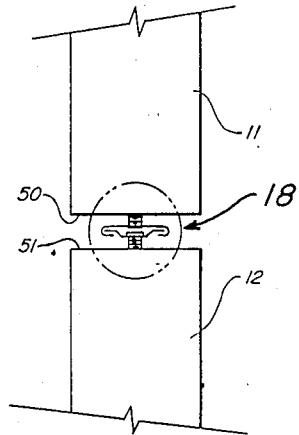
FIG. 3 is a side view showing the utilization of an alternative structure of the clip joining device.

In some instances clips 11 and 12 are built without base plates which protrude. Such a clip arrangement is shown in FIG. 3 of the drawings. FIG. 3 illustrates generally the attachment of a modified clip joining device 18 for attachment to base plate 50 of clip 11 and base plate 51 of clip 12. In this particular case, base plates 50 and 51 are provided with or modified to include threaded holes by means of which the modified clip joining device 18 is attached thereto.

Figure 4:
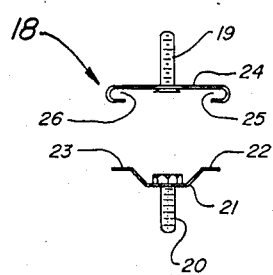
FIG. 4 is an expanded view showing the structure of the clip joining device shown in the encircled are of FIG. 3.

FIG. 4 is an expanded view of the modified clip joining device 18 shown in the encircled area of FIG. 3. Modified clip joining device 18 consists of a first section 24 constructed of a sheet of metal or other structurally strong material having curved formed sections 25 and 26 as shown. An attaching means such as threaded rod 19 is provided to facilitate attachment of section 24 to a clip such as clip 11 of FIG. 3.

A second section 21 of modified clip joining device 18 is provided to attach to first section 24. Section 21 is formed as shown to include extensions 22 and 23 which slide and fit snugly into formed sections 25 and 26 of section 24. Section 21 is secured to a clip such as clip 12 of FIG. 3 by attachment means such as threaded rod 20. Sections 21 and 24 of modified clip joining device 18 were here constructed of spring steel to ensure continued snug fit during use.

The clip joining devices 10 and 18 as taught herein were designed to provide a device easily retrofittable to existing clips. While the clip joining device 10 of FIGS. 1 and 2 was designed to easily attach to and be removed from a clip having a protruding base plate, the modified clip joining device 18 of FIGS. 3 and 4 was designed to allow for attachment to existing clips without protruding base plates.

Although the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A clip joining device for use in attaching a base plate of a first clip to a base plate of a second clip to increase the amount of ammunition readily available during use of a firearm, comprising:
    a body having:
        a first formed section positioned, oriented and shaped to fit around a first end of said base plate of said first clip;
        a second formed section positioned, oriented and shaped to fit around a second end of said base plate of said first clip;
        a third formed section positioned, oriented and shaped to fit around a first end of said base plate of said second clip, and
        a fourth formed section positioned, oriented and shaped to fit around a second end of said base plate of said second clip.

2. The invention of claim 1, wherein said body consists substantially of:
    a first elongated plate having its ends formed to create said first and second formed sections, and
    a second elongated plate attached to said first elongated plate and having its ends formed to create said third and fourth formed sections.

3. The invention of claim 2, wherein said first and second elongated plates are attached to each other by weld means.

4. The invention of claim 2, wherein said first and second elongated plates are constructed of spring steel.

5. The invention of claim 3, wherein said first and second elongated plates are constructed of spring steel.

6. A clip joining device for use in attaching a base plate of a first clip to a base plate of a second clip to increase the amount of ammunition readily available during use of a firearm, comprising:
    a first section consisting substantially of an elongated plate having a first end and a second end;
    a first fastening means extending from said first section whereby said first section is attached to said base plate of said first clip;
    a second section consisting substantially of an elongated plate having:
        a first end;
        a second end;
        a first formed section positioned at said first end of said elongated plate of said second section and positioned, oriented and shaped to fit around said first end of said elongated plate of said first section, and
        a second formed section positioned at said second end of said elongated plate of said second section and positioned, oriented and shaped to fit around said second end of said elongated plate of said first section, and
    a second fastening means extending from said second section whereby said second section attachs to said base plate of said second clip.

7. The invention of claim 6, wherein said first and second fastening means consist of threaded rods.

8. The invention of claim 6, wherein said first and second sections are constructed of spring steel.

9. The invention of claim 7, wherein said first and second sections are constructed of spring steel.

* * * * *